UNITED STATES PATENT OFFICE.

JOSEPH KOETSCHET, OF ST. FONS, FRANCE, ASSIGNOR TO LA SOCIÉTÉ CHIMIQUE DES USINES DU RHÔNE, ANCIENNEMENT GILLIARD, P. MONNET ET CARTIER, OF LYONS, FRANCE.

NITRO TOLUYLIC ALDEHYDE.

SPECIFICATION forming part of Letters Patent No. 662,074, dated November 20, 1900.

Original application filed June 3, 1899, Serial No. 719,298. Divided and this application filed June 6, 1900. Serial No. 19,198.

(No specimens.)

*To all whom it may concern:*

Be it known that I, JOSEPH KOETSCHET, chemist, of St. Fons, near Lyons, France, have invented certain new and useful Improvements in the Manufacture of a New Nitro Compound of Toluylic Aldehyde, of which the following is a specification.

This invention has reference to the manufacture of a new nitro compound of toluylic aldehyde particularly applicable for use in the manufacture of indigo coloring-matters and intermediate products, more especially in the manner described in my application for patent dated June 3, 1899, Serial No. 719,298.

I have discovered that when meta-toluylic aldehyde is nitrated a mixture of nitro products is obtained, varying in proportion according to the conditions of nitration, and from this mixture I have isolated the crystalline mono-nitro toluylic aldehyde, hereinafter more fully described.

In carrying the present invention into effect I preferably proceed under the following conditions of nitration; but it will be understood that these conditions and the proportions of the various reagents may be varied: Two kilos of meta-toluylic aldehyde are dissolved in twenty kilos concentrated sulfuric acid (ninety-eight per cent.) at a temperature of about 40° centigrade, and to this solution is added, with constant stirring, 1.44 kilos dry nitrate of soda. The temperature is maintained at 40° to 45° centigrade, and when the reaction is finished the nitrated mixture is poured upon ice. The oily mixture of nitro-aldehyde is separated by decantation, washed with water, a small quantity of nitro toluylic acid which is formed is removed by carbonate of soda, and the product again washed with water. About two and one-half kilos crude nitro-aldehyde may thus be obtained. The crude nitration product is then fractionally distilled *in vacuo* and at a pressure of two millimeters nearly the whole distils over between 135° and 145° centigrade. The first two-thirds of the distillate may be collected apart and treated in the manner described in another application of even date herewith for the purpose of obtaining the nitro compound therein described. The last third of the distillate is collected apart and cooled to 0° centigrade, when a crystalline mass of a nitro-aldehyde is formed and removed from the mother-liquor by filtration at 0° centigrade. This new nitro-aldehyde crystallizes in yellow needles which when pure melt at 43° to 44° centigrade, (uncorrected.) The mother-liquor from the filtration may be resubmitted to fractional distillation until no further crystals are obtained from the fractions, even at a temperature of −10° centigrade. The nitro-aldehydes probably contained in the residue have not hitherto been obtained crystalline.

The method of separation from the crude nitrated toluylic aldehyde of the crystalline product melting at 43° to 44° centigrade is merely given as typical and may be modified in detail as the proportions of this nitro product in the crude material may require.

The difference between the crystalline nitro toluylic aldehyde melting at 43° to 44° centigrade and that described in my said application of even date herewith is further demonstrated by the different compounds which said nitro-aldehydes yield with anilin, hydroxylamin, phenyl-hydrazin, &c., all of which have been prepared by me. The compound of the present nitro-aldehyde with anilin melts about 51° centigrade, the compound with hydroxylamin melts about 105° centigrade, and the compound with phenyl-hydrazin about 142° centigrade. Moreover, whereas the nitro-aldehyde melting at 43° to 44° centigrade yields an unknown acid melting at 135° centigrade, the nitro-aldehyde melting at 64° centigrade yields on gentle oxidation a corresponding acid melting at 218° to 220° centigrade.

What I claim, and desire to secure by Letters Patent, is—

1. As a new product nitro-toluylic aldehyde which is a derivative of meta-toluylic aldehyde and which when pure crystallizes in yellow needles melting at about 43° to 44° centigrade (uncorrected) and forms a crystalline compound with anilin melting at about 51° centigrade, a crystalline compound with hydroxylamin melting at about 105° centigrade, and a crystalline compound with phenylhydrazin melting at about 142° centigrade.

2. As a new product solid o-nitro-toluylic aldehyde having the methyl group in the meta (1:3) position relatively to the aldehydic group which crystallizes in yellow needles and when pure melts at about 43° to 44° centigrade (uncorrected) and forms a crystalline compound with anilin melting at about 51° centigrade, a crystalline compound with hydroxylamin melting at about 105° centigrade, and a crystalline compound with phenylhydrazin melting at about 142° centigrade.

In witness whereof I have hereunto signed my name in the presence of two subscribing witnesses.

JOSEPH KOETSCHET.

Witnesses:
RODOLPHE PFISTER,
EMIL MARQUETANT.